(12) United States Patent
Nakiri et al.

(10) Patent No.: US 7,981,310 B2
(45) Date of Patent: Jul. 19, 2011

(54) METHOD FOR PREPARING MAGNETIC PAINT AND MAGNETIC RECORDING MEDIUM COMPRISING THE SAME

(75) Inventors: Kazuhiko Nakiri, Ibaraki (JP); Sadamu Kuse, Ibaraki (JP); Hiroyuki Mitsuhashi, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 201 days.

(21) Appl. No.: 12/043,538

(22) Filed: Mar. 6, 2008

(65) Prior Publication Data

US 2008/0220291 A1    Sep. 11, 2008

(30) Foreign Application Priority Data

Mar. 7, 2007    (JP) .................................. 2007-056614

(51) Int. Cl.
*C09D 5/23*    (2006.01)

(52) U.S. Cl. .................................. 252/62.54; 252/62.53

(58) Field of Classification Search ............... 252/62.54, 252/62.53; 427/128, 220; 428/842.2, 843.1, 428/842, 407

See application file for complete search history.

(56) References Cited

U.S. PATENT DOCUMENTS

| 4,533,565 A | * | 8/1985 | Okita ........................... 427/502 |
| 5,544,817 A | * | 8/1996 | Brownbridge et al. ......... 241/21 |

FOREIGN PATENT DOCUMENTS

| JP | 2001-076340 A | 3/2001 |
| JP | 2003-268404 A | 9/2003 |

* cited by examiner

*Primary Examiner* — C. Melissa Koslow
(74) *Attorney, Agent, or Firm* — Birch, Stewart, Kolasch & Birch, LLP

(57) ABSTRACT

A magnetic paint is prepared by a method comprising a surface-treating step for magnetic powder, to obtain a first composition by mixing and stirring a composition which comprises a magnetic powder, a dispersant and/or a binder resin, and an organic solvent, and which contains 40% by weight or less of a non-solvent component, while applying a shear force to the composition; and a concentrating step to obtain a second composition by concentrating the first composition until the content of the non-solvent components of the first composition reaches 80% by weight or more.

5 Claims, No Drawings

METHOD FOR PREPARING MAGNETIC PAINT AND MAGNETIC RECORDING MEDIUM COMPRISING THE SAME

FIELD OF THE INVENTION

The present invention relates to a method for preparing a magnetic paint, and a magnetic recording medium comprising the magnetic paint.

DESCRIPTION OF PRIOR ART

Magnetic recording media find various applications. Above all, as magnetic recording media for use in computer data backup, computer tapes and hard discs are mainly used. Computer tapes for data backup, which are also called backup tapes, having a storage capacity of several hundreds GB or more per reel are commercialized. Meanwhile, it is expected that the storage capacity of a hard disc will be further increased in near future, which means inevitable increase of the storage capacity of a backup tape. To increase the storage capacity of such a magnetic recording media, it is essential to further decrease a recording wavelength and to further decrease a track width.

Generally, a high capacity computer tape is manufactured by applying, to a flexible substrate, a magnetic paint prepared by dispersing a magnetic powder and a binder resin in a solvent. To meet the increase of the recording densities of the magnetic recording media, the particle size of the magnetic powder used is made smaller and smaller. Under such a situation, ferromagnetic metal powders having a large magnetic energy represented by a saturation magnetization as is used. However, it is known that the agglomerating tendency of the respective particles of the magnetic powder increases, as the particle sizes become smaller, and as the particles have a higher magnetic energy.

In the meantime, magnetic recording media are required to satisfy all of the following requirements: the decrease of spacing loss by smoothening the surfaces of the recording media, to decrease the thickness of magnetic layers; the prevention of dropouts due to the defects on the surfaces of the media; the uniformity of the coercive force distribution of the magnetic powder; and high durability to withstand frequent use for a long time. To meet these requirements, it is essential that a magnetic paint should be sufficiently dispersed.

In general, a magnetic paint is prepared by mixing and stirring magnetic powder which comprises an acicular, granular or plate-form magnetic particles, a non-magnetic powder, a binder resin, an organic solvent and other additives such as a dispersant.

However, the above-described increasing agglomerating tendency of the magnetic powder due to its ultrafine particles and higher magnetic energy, in association with the increasing storage capacity of a magnetic recording medium, makes it difficult to uniformly coat the particles of the magnetic powder, etc. with the dispersant and the binder resin, so that the particles are difficult to be dispersed. The magnetic particles which are less uniformly coated with the dispersant and the binder resin cannot be sufficiently dispersed. Thus, improved magnetic characteristics cannot be expected from such a magnetic paint.

To solve such a problem, there are provided a method for mechanically mixing ferromagnetic powder with a binder resin and a dispersant as an effort to make effective use of a mechanochemical reaction (cf. JP-A-2001-76340), and a method for subjecting a ferromagnetic powder mixed with an organic compound, to a dry compaction treatment (cf. JP-A-2003-268404).

However, the conventional surface-treating methods (cf. JP-A-2001-7.6340 and JP-A-2003-268404) have the following drawbacks: since the surface treatment is carried out using only the dispersant and the binder but no solvent, it is impossible to uniformly apply the dispersant and the binder resin to the surfaces of the ultrafine magnetic particles having an average particle size of smaller than 50 nm; and it is difficult to disperse such magnetic particles with any of various kinds of dispersers, so that the magnetic characteristics cannot be improved, and thus the characteristics of the ultrafine magnetic particles cannot be sufficiently exerted. It is especially difficult to homogeneously treat granular ultrafine magnetic particles by any of the conventional surface-treating methods.

SUMMARY OF THE INVENTION

Under such circumstances, an object of the present invention is to provide a method for preparing a magnetic paint by way of a surface treatment which enables uniform coating of the surfaces of ultrafine magnetic particles with a dispersant and a binder resin so that the ultrafine magnetic particles can be sufficiently dispersed. Another object of the present invention is to provide a magnetic recording medium which comprises a magnetic paint prepared by such a method and which is excellent in electromagnetic conversion characteristics.

To achieve the above objects, the present inventors have intensively researched a method for preparing a magnetic paint comprising ultrafine magnetic particles. As a result, they have found that the above objects can be achieved by a preparing method for a magnetic paint, comprising the following steps, and accomplished the present invention based on this finding. That is, the present invention provides a method for preparing a magnetic paint comprising a magnetic powder surface-treating step for obtaining a first composition by mixing and stirring a composition which comprises a magnetic powder, a dispersant and/or a binder resin, and an organic solvent and which has a non-solvent content of 40% by weight or less, while applying a shear force to the composition; and a concentrating step for obtaining a second composition by concentrating the first composition until the content of the non-solvent components of the first composition reaches 80% by weight or more.

In the preparation of the magnetic paint, the surface-treating step for obtaining the first composition is conducted by adjusting to 40% by weight or less the content of the non-solvent components of the composition which comprises the magnetic powder, the dispersant and/or the binder resin, and the organic solvent, and mixing and stirring the composition under a shear force. Accordingly, the wettability of the surfaces of the ultrafine magnetic particles of the magnetic powder is improved, even if the ultrafine magnetic particles have an average particle size of smaller than 50 nm, and such ultrafine magnetic particles can be uniformly coated with the dispersant and the binder resin. Further, the concentrating step for obtaining the second composition is conducted by concentrating the first composition until the content of the non-solvent component reaches 80% by weight or more. Therefore, the composition having such a high concentration of the solid content can be kneaded in a kneading step in the process for preparing the magnetic paint, as will be described later. Thus, it becomes possible to effectively exhibit compacting and shearing actions.

According to the preparing method of the present invention, the surfaces of the ultrafine magnetic particles of the magnetic powder can be efficiently and uniformly coated with the dispersant and the binder resin, and thus, such ultrafine magnetic particles can be easily dispersed with any of various kinds of dispersers to prepare a highly dispersed magnetic paint. As a result, a magnetic recording medium which can show excellent recording characteristics in a short wavelength range can be provided.

DETAILED DESCRIPTION OF THE INVENTION

The surface treatment of magnetic powder is generally made by smashing the granules of the magnetic powder with a high speed stirring mixer, and mixing such smashed particles with a dispersant and a binder resin in the high speed stirring mixer to carry out the surface treatment of the magnetic particles and mix the magnetic particles with the binder resin. However, by this conventional method, it is difficult to uniformly treat the surfaces of ultrafine magnetic particles, especially, ultrafine magnetic particles with an average particle size of smaller than 50 nm.

When the surfaces of magnetic particles are treated by the method of the present invention, the magnetic particles are mixed with a binder resin and/or a dispersant, and the mixture is treated with an organic solvent, while adjusting the content of a non-solvent components to 40% by weight or less, preferably 30% by weight or less, more preferably 20% by weight or less. the content of the non-solvent components can be considerably decreased, but it is usually 1% by weight or more, preferably 10% by weight or more.

When the content of the non-solvent component exceeds 40% by weight, the magnetic particles cannot be uniformly wetted with the solvent, which leads to an excessive increase in the viscosity of the composition, with the result that the smashing of the magnetic particles cannot be facilitated, which makes it difficult to uniformly treat the surfaces of the particles. When the content of the non-solvent component is less than 1% by weight, a large amount of the solvent is needed, which increases costs.

In the surface treatment of the magnetic particles, other non-magnetic powder such as abrasive powder, carbon black, etc. to be contained in the magnetic paint may be present. The content of the non-solvent component herein is intended to mean the total (% by weight) of the magnetic powder, the non-magnetic powder, the binder resin, the dispersant (including a liquid type), etc., in other words, all the materials for the surface-treatment, except for the organic solvent. Hereinafter, the content of the non-solvent component is optionally referred to as a concentration of a solid content.

In the surface treating step, preferably, the materials are mixed and stirred under a shear force.

A specific apparatus to be used in the surface treating step is not limited, in so far as it is a stirring mixer capable of applying a shear force. Thus, any of conventional stirring mixers may be used. The shear force used herein includes any mechanical energy effective to disperse the powder, such as impact force and cavitation, besides a shearing stress.

Typical examples of the stirring mixer include a rotary shearing type stirrer in which a rotary shaft with rotary blades is rotated at a high speed in a dispersing container; an attritor or a sand mill in which a rotary shaft with rotary blades is rotated at a high speed in a dispersing container holding dispersing media; an ultrasonic disperser; a high pressure spray impingement type disperser; etc.

In the surface treating step, it is preferable to apply a shear force as high as possible, so that the shear rate is preferably $10^4$/sec. or higher, more preferably $10^5$/sec. or higher. Such a high shear force can be applied by using a stirrer capable of rotating at a high speed and provided with rotary blades and a stationary portion which are spaced to each other with a narrow clearance therebetween. Examples of such a stirrer include batch type stirrers such as Ultratarax (IKA), T.K. Homomixer (PRIMIX), T.K. Filmix (PRIMIX) and Clearmix (M TECHNIQUE Co., LTD.). Continuous type stirrers such as an Ebara milder (EBARA) and CAVITRON (Euro Teck) are also included therein. The continuous type stirrer may be used for one treatment or may be used for a plural number of treatments by assembling a circulation line.

In the present invention, after the above surface treating step, the first composition is concentrated: that is, the organic solvent is evaporated off by heating or depressurizing so that the concentration of the solid component can be 80% by weight or more. This concentration is carried out in order to knead the composition having a high concentration of the solid content in the following kneading step in the process of preparing the magnetic paint, so as to effectively exhibit the compacting and shearing actions.

In the present invention, the concentration of the solid content of the second composition obtained after the concentrating step may be appropriately selected in accordance with the type of a kneader to be used in the kneading step. However, the concentration of the solid content is preferably 80% by weight or more, more preferably 90% by weight or more, still more preferably 95% by weight or more. While the upper limit of the concentration of the solid content of the second composition is not limited, the concentration preferably does not exceed 99.9% by weight.

The concentrating method is not limited, and the first composition may be concentrated by a known method such as heating or depressurizing. However, preferably, the first composition is concentrated while being stirred or vibrated so as not to form large agglomerates of the particles.

As the dispersant and the binder resin for use in the surface treating step, there may be used conventionally known dispersants and binder resins for use in the preparation of magnetic paints, as will be described later. Preferably, the dispersant and the binder resin are selected in accordance with the type of magnetic powder to be used, or the specification and application of a magnetic recording medium to be produced; and either or both of the dispersant and the binder resin may be used. In either case, the amount of the dispersant to be used is preferably from 0.1 to 10% by weight based on the weight of the magnetic powder, and the amount of the binder resin to be used is preferably from 0.5 to 20% by weight based on the weight of the magnetic powder, in order to appropriately exert their respective effects, respectively.

In the present invention, preferably, the composition, which has undergone the surface treating step and the concentrating step, is mixed with a binder resin and a solvent, and such a composition with a high concentration of the solid content is then kneaded under compacting and shear forces. After the kneading step, the resulting composition is diluted and further dispersed, as is done in the conventional process for the preparation of a magnetic paint. Thus, a magnetic paint having excellent dispersity can be obtained.

In the kneading step, the composition is kneaded with a batch type kneader or a continuous twin-screw kneader; and in the diluting step, the second composition is diluted with a batch type kneader, a continuous twin-screw kneader or other diluting device, as a step after the kneading step.

As the above continuous twin-screw kneader, KEX-30, KEX-40, KEX-50, KEX-65 or KEX-80 (KURIMOTO LTD.), or TEX30αII, TEX44αII, TEX65αII, TEX77αII or TEX90αII (THE JAPAN STEEL WORKS, LTD.) or the like may be used.

In the dispersing step, the composition is dispersed with a media type disperser. As the media type disperser, there can be used conventional dispersers such as a disperser in which a stirring shaft is provided with a disc (bored, notched or grooved), a pin or a ring, a disperser in which a rotor is rotated, such as NANOMILL, PICOMILL, SAND MILL, DINOMILL, etc.

The particle size of the dispersing media is preferably from 0.05 to 2.0 mm, more preferably from 0.2 to 1.6 mm. This range of the particle size is preferable, because, when the particle size is smaller than 0.05 mm, separation of the media from a paint becomes difficult, and because, when the particle size exceeds 2.0 mm, the dispersing power of the media to ultrafine particles decreases.

As the dispersing media, known dispersing media such as glass media (particles), ceramic media, metal media (including metal media coated with a resin), etc. may be used. Especially for ultrafine magnetic particles, a material having a high density (3 g/cm$^3$ or more) is preferably used. The amount of the dispersing media to be packed in a mill container is preferably from 50 to 90% in terms of an apparent volume ratio to the interior volume of the mill. When the apparent volume ratio is less than 50%, the dispersing efficiency tends to lower. On the other hand, when it exceeds 90%, the movement of the dispersing media deteriorates, and also the amount of heat generated increases.

The rotating speed of the stirring shaft is preferably from 6 to 15 m/sec. in terms of the peripheral speed of the rotary portion. When the peripheral speed of the rotary portion is lower than 6 m/sec., the dispersing energy of the dispersing media is small. On the other hand, when it exceeds 15 m/sec., the dispersing media may be destructed.

While the residence time of the magnetic paint in the paint-dispersing step varies depending on the components of the magnetic paint and the application thereof, it is preferably from 30 to 90 minutes. When two or more sand mills are used to disperse the paint, dispersing conditions for each of the mills may be changed: for example, dispersing media with a large particle size are firstly used, and dispersing media with a small particle size are finally used.

After the dispersing step using the media type disperser, it is preferable to disperse the paint with a high pressure spray impingement type disperser. As the high pressure spray impingement type disperser, there can be used the known dispersers such as a disperser having a chamber where a dispersed material is compressed with a high pressure plunger pump and is discharged from a nozzle having a small diameter, and a disperser having a chamber where treating liquids are sprayed from opposed nozzles at high speeds under high pressures to collide dispersed materials to each other (e.g., ultimizer, homogenizer, nanomizer, etc.). The applied pressure for dispersion is preferably 50 MPa or higher, more preferably 100 MPa or higher. Preferably, two or more times of treatments are conducted by taking into account a difference in viscosity found before and after the dispersion, a particle size distribution of the dispersed components in the paint, prevention of short path of the paint, etc. To prevent the clogging of the nozzle, it is preferable to filtrate the paint through a filter or the like to remove coarse particles before the dispersing step.

<Magnetic Powder>

While the magnetic powder to be used in the preparation of the magnetic paint in the present invention may be a known magnetic powder, ferromagnetic iron-based magnetic powder, iron nitride magnetic powder, plate-form hexagonal ferrite magnetic powder or the like is preferably used. Magnetic powder with an average particle size of smaller than 50 nm and usually not smaller than 10 nm is preferable, and magnetic powder with an average particle size of from 15 to 40 nm is more preferable. When the average particle size is 50 nm or larger, noises attributed to the particle size become larger. When the average particle size is smaller than 10 nm, the coercive force tends to lower, or the surface energies of the particles tends to increase, with the result that such magnetic powder becomes difficult to be dispersed in the paint.

<Binder Resin>

An example of the binder resin is a mixture of a polyurethane resin with at least one resin selected from vinyl chloride resins, vinyl chloride-vinyl acetate copolymer resins, vinyl chloride-vinyl alcohol copolymer resins, vinyl chloride-vinyl acetate-vinyl alcohol copolymer resins, vinyl chloride-vinyl acetate-maleic anhydride copolymer resins, vinyl chloride-hydroxyl group-containing alkyl acrylate copolymer resins, and cellulose resins such as nitrocellulose.

Among these resins, a polyurethane resin in combination with a vinyl chloride-hydroxyl group-containing alkyl acrylate copolymer resin is preferably used. Examples of the polyurethane resin include a polyester polyurethane resin, a polyether polyurethane resin, a polyether polyester polyurethane resin, a polycarbonate polyurethane resin, a polyester polycarbonate polyurethane resin, etc.

Preferably, such a binder resin has, as a functional group, a group of the formula: —COOH, —SO$_3$M, —OSO$_3$M, —P=O(M)$_3$ or —O—P=O(M) [wherein M represents a hydrogen atom, an alkali metal element or an amide group], or a group of the formula: —OH, —NR$_1$R$_2$ or —N$^+$R$_3$R$_4$R$_5$ [wherein each of R$_1$, R$_2$, R$_3$, R$_4$ and R$_5$, the same or different, represents a hydrogen atom or a hydrocarbon group] or an epoxy group.

The use of the binder resin having such a functional group is effective to improve the dispersity of the magnetic powder, etc. When two or more kinds of the resins are used in combination, it is preferable that the polarities of their functional groups are the same. Above all, the combination of the binder resins which have —SO$_3$M groups, respectively is preferred.

The binder resin is used in an amount of usually from 7 to 50 parts by weight, preferably from 10 to 35 parts by weight, per 100 parts by weight of the magnetic powder. Especially when a vinyl chloride-based resin is used in combination with a polyurethane resin as the binder resin, preferably 5 to 30 parts by weight of the vinyl chloride-based resin is used in combination with 2 to 20 parts by weight of the polyurethane resin.

It is also preferable to use any of these binder resins in combination with a thermocurable crosslinking agent which is bonded to the functional group in the binder resin to crosslink the binder resin.

Preferable examples of such a crosslinking agent include various polyisocyanates such as tolylene diisocyanate, hexamethylene diisocyanate, isophorone diisocyanate, a reaction product obtained from any of these isocyanates with a hydroxyl group-containing compound having two or more hydroxyl groups (e.g., trimethylolpropane or the like), a condensation product of any of the above isocyanates, etc.

The crosslinking agent is usually used in an amount of from 1 to 50 parts by weight, preferably from 15 to 35 parts by weight, per 100 parts by weight of the binder resin.

In place of the above thermocurable binder resin, a radiation curable resin may be used. As a radiation curable resin, there is used a radiation curable resin obtained by acrylicly modifying the above thermocurable resin to introduce a radiation sensitive double bond into the resin, or an acryl monomer or an acryl oligomer.

<Organic Solvent>

Examples of the organic solvent to be used in the preparation of the magnetic paint in the present invention include ketone solvents such as methyl ethyl ketone, cyclohexanone and methyl isobutyl ketone; ether solvents such as tetrahydrofuran and dioxane; acetate solvents such as ethyl acetate and butyl acetate; glycol solvents such as ethylene glycol, propylene glycol, ethyleneglycol monoethyl ether and propyleneglycol monomethyl ether, etc. Any of these organic solvents may be used alone, or some of them may be used as a mixture, or any of them may be mixed with an aromatic solvent such as toluene.

As additives to be used in the preparation of the magnetic paint in the present invention, an abrasive, a lubricant and a dispersant may be used.

<Abrasive>

Examples of the abrasive include powder having a Moh's hardness of 6 or more, such as α-alumina, β-alumina, silicon carbide, chromium oxide, cerium oxide, α-iron oxide, corundum, artificial diamond, silicon nitride, titanium carbide, titanium oxide, silicon dioxide, boron nitride, etc. Each of these abrasives may be used alone or in combination. The particle size of the abrasive is preferably from 10 to 200 nm in terms of an average particle size.

The magnetic paint may optionally contain conventional carbon black in order to improve the electrical conductivity and surface smoothness. As the carbon black, acetylene black, furnace black, thermal black or the like may be used. Carbon black with an average particle size of from 10 to 100 nm is preferable. Carbon black with an average particle size of smaller than 10 nm is difficult to be dispersed, and carbon black with an average particle size of exceeding 100 nm should be added in a large amount. In any case, the surface of the resultant magnetic film becomes rough, which will cause the decrease of an output. If necessary, two or more kinds of carbon black which have different average particle sizes may be used.

<Lubricant>

As the lubricant to be added to the magnetic paint, a fatty acid, a fatty acid ester, a fatty acid amide or the like is exemplified. Preferably, the lubricant is contained in the paint in relation to the magnetic powder as follows: 0.5 to 5% by weight of the fatty acid is contained in the paint; 0.2 to 3% by weight of the fatty acid ester is contained in the paint; or 0.5 to 5.0% by weight of the fatty acid amide is contained in the paint. When the addition amount of the fatty acid is smaller than 0.5% by weight, the friction coefficient-decreasing effect is low, while, when it exceeds 5% by weight, the toughness of the resultant magnetic layer may be lost. When the addition amount of the fatty acid ester is smaller than 0.2% by weight, the friction coefficient-decreasing effect is low. On the other hand, when it exceeds 3% by weight, the amount of the fatty acid ester which migrates to a magnetic layer becomes too large, resulting in a disadvantage that the resultant tape is likely to stick to a head. When the addition amount of the fatty acid amide is smaller than 0.5% by weight, direct contact between the magnetic layer and a head occurs, which leads to a lower antiseizing effect. On the other hand, when it exceeds 5.0% by weight, the fatty acid amide bleeds out, which tends to cause defects such as dropout, etc.

Preferable as the fatty acid is a fatty acid having 10 or more carbon atoms, which may be any of a linear chain, a branched chain or a cis or trans isomer. However, a linear fatty acid is preferable because of its superior lubricating property. Examples of the fatty acid include lauric acid, myristic acid, stearic acid, palmitic acid, behenic acid, oleic acid, linoleic acid, etc., among which myristic acid, stearic acid and palmitic acid are preferred. As the fatty acid ester, esters of the above fatty acids are preferable. As the fatty acid amide, amides of the fatty acids having 10 or more carbon atoms, such as palmitic acid and stearic acid are used.

<Dispersant>

A dispersant may be used to sufficiently disperse the magnetic powder and the additives such as the abrasive and the carbon black in the organic solvent. As such a dispersant, there can be used any of the conventional dispersants such as fatty acids each having 12 to 18 carbon atoms [RCOOH wherein R represents an alkyl or alkenyl group having 11 to 17 carbon atoms] (e.g., caprylic acid, capric acid, lauric acid, myristic acid, palmitic acid, stearic acid, behenic acid, oleic acid, elaidic acid, linoleic acid, linolenic acid, stearolic acid, etc.); alkali metals salts or alkaline earth metals salts of the above fatty acids (i.e., metal soaps); fluorinated compounds of the above fatty acid esters; amides of the above fatty acids; polyalkylene oxide alkyl phosphate; lecithin; trialkylpolyolefinoxy quaternary ammonium salt (wherein alkyl is an alkyl group having 1 to 5 carbon atoms; and olefin is ethylene, propylene or the like); sulfate; sulfonate; phosphate; copper phthalocyanine; etc. Any of these dispersants may be used alone or in combination. The dispersant is usually used in an amount of from 0.5 to 10 parts by weight per 100 parts by weight of the magnetic powder.

In the present invention, the organic solvent and the above-described additives are used together with the magnetic powder, the dispersant and/or the binder resin, and the resulting mixture is dispersed by the above-described method to prepare the magnetic paint. The magnetic paint is applied to a non-magnetic substrate by a conventional method, and is dried to form a magnetic layer, which is then subjected to a predetermined process to obtain a magnetic recording medium.

In the present invention, the (dry) thickness of the magnetic layer is preferably 0.01 μm or more and 0.15 μm or less. When the thickness of the magnetic layer is less than 0.01 μm, an output therefrom is small, and such a magnetic layer is difficult to be uniformly formed. On the other hand, when the thickness thereof exceeds 0.15 μm, the resolution of short wavelength signals deteriorates. The thickness of the magnetic layer is more preferably from 0.01 to 0.1 μm, most preferably from 0.02 to 0.06 μm, in order to further improve the recording characteristics in a short wavelength range.

While the magnetic layer may be directly formed on the non-magnetic substrate, it is preferable to form the magnetic layer through a primer layer. If necessary, a top coat layer may be formed on the magnetic layer to protect the magnetic layer. Further, the magnetic layers may be formed on both surfaces of the non-magnetic substrate so as to increase the capacity of the resultant magnetic recording medium. Alternatively, when the magnetic layer is formed on only one surface of the non-magnetic substrate, it is generally desirable to form a back coat layer on the rear side of the non-magnetic substrate.

<Non-Magnetic Substrate>

While the thickness of the non-magnetic substrate varies depending on an end use, it is generally from 1.5 to 11 μm. More preferably, the thickness of the non-magnetic substrate is from 2 to 7 μm. When this thickness is less than 1.5 μm, it becomes difficult to form a film, or the strength of the resultant tape decreases. On the other hand, when the thickness exceeds 11 μm, the total thickness of the resultant tape increases, and the recording capacity per one reel of the tape decreases.

The Young's modulus in its lengthwise direction of the non-magnetic substrate is preferably 5.8 GPa (590 kg/mm$^2$) or more, more preferably 7.1 GPa (720 kg/mm$^2$) or more.

When the Young's modulus in the lengthwise direction of the non-magnetic substrate is less than 5.8 GPa, the running of the resultant tape may become unsatable.

In a helical scan type tape, the ratio of the Young's modulus (MD) of the non-magnetic substrate in the lengthwise direction to the Young's modulus (TD) thereof in the widthwise direction is preferably from 0.6 to 0.8, more preferably from 0.65 to 0.75. When the ratio of the Young's modulus of the non-magnetic substrate in the lengthwise direction to the Young's modulus thereof in the widthwise direction is smaller than 0.6 or larger than 0.8, variation (or flatness) in output between the inlet of the track of a magnetic head and the outlet thereof is likely to increase. The variation becomes minimum at and around 0.7 in the ratio of the Young's modulus in the lengthwise direction to the Young's modulus in the widthwise direction.

In a linear recording type tape, the ratio of the Young's modulus in the lengthwise direction to the Young's modulus in the widthwise direction is preferably from 0.7 to 1.3.

The coefficient of thermal expansion in the widthwise direction of the non-magnetic substrate is preferably from $-10$ to $10 \times 10^{-6}$, and the coefficient of moisture expansion in the widthwise direction thereof is preferably from 0 to $10 \times 10^{-6}$. When the coefficient of thermal or moisture expansion in the widthwise direction of the non-magnetic substrate is outside the above range, an off-track is likely to occur due to the change of temperature or humidity, and thus, an error rate is likely to increase.

Examples of the non-magnetic substrate satisfying the above-described characteristics include a polyethylene terephthalate film, a polyethylene naphthalate film, an aromatic polyamide film, an aromatic polyimide film, etc. which are all biaxially oriented.

<Primer Layer>

To obtain a magnetic layer having a high recording density, it is desirable to reduce the thickness of the magnetic layer. To reliably obtain a thin magnetic layer having durability, it is preferable to provide a primer layer (a non-magnetic layer) between the magnetic layer and the non-magnetic substrate. The thickness of the primer layer is preferably from 0.2 to 1.5 μm, more preferably 1 μm or less, still more preferably 0.8 μm or less. When the thickness of the primer layer is less than 0.2 μm, the effect of the primer layer to decrease a variation in the thickness of the magnetic layer and the effect thereof to improve the durability of the magnetic layer become poor. On the other hand, when this thickness exceeds 1.5 μm, the total thickness of the resultant magnetic tape become too large, which leads to a smaller recording capacity per one reel of the tape. As a binder resin (and a crosslinking agent) to be used in the primer layer and a solvent for use in a paint for forming the primer layer, the same materials as used in the magnetic paint may be used.

Examples of non-magnetic powder for use in the primer layer include titanium oxide, iron oxide, aluminum oxide, etc. However, the use of iron oxide alone or a mixture of iron oxide and aluminum oxide is preferable. The particle shape of the non-magnetic powder may be spherical, plate-form, acicular or spindle-form. In case of acicular or spindle-form particles, the length of the major axes is preferably from 20 to 200 nm, and the length of the minor axes is preferably from 5 to 200 nm. In most cases, the primer layer contains the non-magnetic powder as a main component, and optionally contains carbon black powder with a particle size of from 0.01 to 0.1 μm and aluminum oxide powder with a particle size of from 0.05 to 0.5 μm as auxiliaries. To form a smooth primer layer with less variation in thickness, it is preferable that the above non-magnetic powder and the above carbon black powder have narrow particle size distributions, respectively. Also, non-magnetic powder comprising plate-form particles with an average particle size of from 10 to 100 nm may be added to the primer layer. As a component of the non-magnetic powder comprising the plate-form particles, an oxide or a composite oxide of a rare earth element such as cerium, and/or an element such as zirconium, silicon, titanium, manganese, iron or the like can be used.

To improve the electric conductivity of the primer layer, carbonaceous powder comprising plate-form particles, such as graphite powder with an average particle size of from 10 to 100 nm, powder of ITO (a composite oxide of indium and tin) comprising plate-form particles with an average particle size of from 10 to 100 nm and the like may be added to the primer layer. By adding such non-magnetic powder comprising plate-form particles, the primer layer is improved in uniformity in thickness, surface smoothness, rigidity and dimensional stability.

<Back Coat Layer>

In the present invention, a back coat layer may be provided on the other surface of the non-magnetic substrate composing the magnetic tape (on the surface of the non-magnetic substrate opposite to the surface on which the magnetic layer is formed) in order to improve the running of the tape.

The thickness of the back coat layer is preferably from 0.2 to 0.8 μm. When this thickness is less than 0.2 μm, the improvement on tape-running is insufficient. On the other hand, when it exceeds 0.8 μm, the total thickness of the tape increases, which leads to a decreased recording capacity per one reel of the . The center line average height Ra of the back coat layer is preferably from 3 to 8 nm, more preferably from 4 to 7 nm.

The back coat layer usually contains carbon black. As the carbon black, acetylene black, furnace black, thermal black or the like may be used. In general, carbon black with a small particle size and carbon black with a large particle size are used. The sum of the addition amounts of the carbon black with a small particle size and the carbon black with a large particle size is preferably from 60 to 100% by weight, more preferably from 70 to 100% by weight, based on the weight of the inorganic powder.

The average particle size of the carbon black with a small particle size is preferably from 5 to 200 nm, more preferably from 10 to 100 nm. When this average particle size is less than 10 nm, dispersion of such carbon black becomes difficult. When this average particle size exceeds 100 nm, a large amount of such carbon black should be added. In either case, the surface of the back coat layer becomes rough, and the particle shape of the carbon black is transferred to the magnetic layer (embossing). When the carbon black with a large particle size (an average particle size of from 200 to 400 nm) is used in an amount of from 5 to 15% by weight based on the weight of the carbon black with a small particle size, the surface of the back coat layer is not roughened, and the effect to improve the running of the tape is enhanced.

Non-magnetic powder comprising plate-form particles with an average particle size of from 10 to 100 nm may be added to the back coat layer, in order to improve the strength and the dimensional stability to temperature and humidity. As a component of this non-magnetic powder, aluminum oxide, or an oxide or a composite oxide of a rare earth element such as cerium and/or zirconium, silicon, titanium, manganese, iron or the like is used.

To improve the electric conductivity of the back coat layer, carbonaceous powder comprising plate-form particles with an average particle size of from 10 to 100 nm or ITO powder comprising plate-form particles with an average particle size of from 10 to 100 nm may be added to the back coat layer. If necessary, iron oxide powder comprising granular particles with an average particle size of from 0.1 to 0.6 μm may be added. The amount of these conductivity-improving additives is preferably from 2 to 40% by weight, more preferably from 5 to 30% by weight, based on the weight of all the inorganic powders in the back coat layer. The addition of alumina powder with an average particle size of from 0.1 to 0.6 μm is preferable, because the durability of the back coat layer is further improved.

As a binder resin for the back coat layer, the same resins as those compounded in the magnetic paint may be used. Above all, the use of a cellulose resin in combination with a polyurethane resin is preferable to decrease the friction coefficient and to improve the running of the tape.

The content of the binder resin in the back coat layer is usually from 40 to 150 parts by weight, preferably from 50 to 120 parts by weight, more preferably from 60 to 110 parts by weight, still more preferably from 70 to 110 parts by weight, per 100 parts by weight in total of the carbon black and the inorganic non-magnetic powder. When the content of the binder resin is less than 40 parts by weight, the strength of the back coat layer is insufficient. On the other hand, when it exceeds 150 parts by weight, the friction coefficient of the back coat layer tends to increase. Preferably, 30 to 70 parts by weight of the cellulose resin and 20 to 50 parts by weight of the polyurethane resin are used.

Preferably, a crosslinking agent such as a polyisocyanate compound is added to the back coat layer so as to cure the binder resin. As the crosslinking agent, the same compounds as those used in the magnetic layer may be used. The amount of the crosslinking agent is usually from 10 to 50 parts by weight, preferably from 10 to 35 parts by weight, more preferably from 10 to 30 parts by weight, per 100 parts by weight of the binder resin. When the amount of the crosslinking agent is less than 10 parts by weight, the film strength of the back coat layer tends to decrease. On the other hand, when it exceeds 35 parts by weight, the dynamic friction coefficient of the back coat layer against a stainless steel (SUS) increases.

EXAMPLES

Hereinafter, the present invention will be described in more detail by the following Examples, which should not be construed as limiting the scope of the present invention in any way. In the Examples and Comparative Examples, "parts" are "parts by weight", and an "average particle size" is a "number-average particle sizes", unless otherwise indicated.

Example 1

| <Components of Magnetic Paint> | |
|---|---|
| (1) Components for Surface-Treating Step | |
| Magnetic powder comprising granular iron nitride particles: (Al—Y—Fe—N) [σs: 105 Am$^2$/kg (90 emu/g); Hc: 214.9 kA/m (2,700 Oe); and average particle size: 17 nm] | 100 parts |
| Polyester polyurethane resin (glass transition temperature: 40° C.; —SO$_3$Na group contained: 1 × 10$^{-4}$ eq./g) | 2 parts |
| Alumina powder | 10 parts |
| Methyl acid phosphate | 4 parts |
| Tetrahydrofuran | 271 parts |

| -continued | |
|---|---|
| <Components of Magnetic Paint> | |
| Solid content concentration: 30% by weight | |
| (2) Concentrating Step | |
| Solid content concentration: 90% by weight | |
| (3) Components for Kneading Step | |
| Vinyl chloride-hydroxypropyl acrylate copolymer (—SO$_3$Na group contained: 0.7 × 10$^{-4}$ eq./g) | 17 parts |
| Polyester polyurethane resin (glass transition temperature: 40° C.; —SO$_3$Na group contained: 1 × 10$^{-4}$ eq./g) | 4 parts |
| Methyl ethyl ketone | 5 parts |
| Cyclohexanone | 7 parts |
| Toluene | 5 parts |
| (4) Components for Diluting Step | |
| Palmitic acid amide | 1 part |
| Butyl stearate | 1 part |
| Cyclohexanone | 190 parts |
| Toluene | 190 parts |
| (5) Components for Blending Step | |
| Polyisocyanate | 6 parts |
| Methyl ethyl ketone | 2 parts |
| Cyclohexanone | 8 parts |
| Toluene | 8 parts |

Firstly, the components for the surface-treating step (1) out of the above-described components of the magnetic paint were charged to a surface-treating tank, and were stirred for 60 minutes, using a rotary shearing type stirrer (Cleamix manufactured by M TECHNIQUE Co., LTD.; rotary blade diameter: 50 mm; gap: 2 mm; revolution rate: 2,000 rpm; and shear rate: 2.6×10$^4$/sec.) (stirring conditions A), to obtain a first composition.

The resulting first composition was transferred to a vertical vibrating drier (VFD-01 manufactured by CHUO KAKOKI CO., LTD.), and the first composition was heated to 60° C. and concentrated under a reduced pressure of 20 KPa, while the tank being vibrated (number of vibration: 1,800 cpm; and amplitude: 2.2 mm). Thus, a second composition having a solid content concentration of 90% by weight was obtained.

The components for the kneading step (3) were added to the second composition, and the resulting mixture was kneaded in a continuous twin-screw kneader. Next, a part of the components for the diluting step (4) was added to the kneaded mixture in the diluting section of the continuous twin-screw kneader, so as to dilute the kneaded mixture. The resulting composition removed from the kneader was further mixed with the rest of the components for the diluting step (4), and the mixture was stirred at a high speed to obtain a homogenous slurry prior to the dispersion thereof.

The above slurry was dispersed for a residence time of 90 minutes in a sand mill (media: 0.5 mmφ zirconia beads; packing ratio; 80% by volume; and blade peripheral speed: 10 m/sec.). To this slurry, the components for the blending step (5) were added, and the mixture was stirred and filtered. The filtered mixture was dispersed 4 times under a pressure of 100 MPa, using a high pressure spray impingement type disperser (Ultimizer manufacture by SUGINO MACHINE LIMITED) to obtain a magnetic paint.

<Components for Primer>

(1) Components

| | |
|---|---|
| Acicular iron oxide particles | 68 parts |
| Carbon black | 20 parts |
| Granular alumina particles | 12 parts |
| Methyl acid phosphate | 1 part |
| Vinyl chloride-hydroxypropyl acrylate copolymer (—SO$_3$Na group contained: $0.7 \times 10^{-4}$ eq./g) | 9 parts |
| Polyester-polyurethane resin (glass transition temperature: 40° C.; —SO$_3$Na group contained: $1 \times 10^{-4}$ eq./g) | 5 parts |
| Tetrahydrofuran | 13 parts |
| Cyclohexanone | 63 parts |
| Methyl ethyl ketone | 137 parts |

(2) Components

| | |
|---|---|
| Butyl stearate | 2 parts |
| Cyclohexanone | 50 parts |
| Toluene | 50 parts |

(3) Components

| | |
|---|---|
| Polyisocyanate | 6 parts |
| Cyclohexanone | 9 parts |
| Toluene | 9 parts |

The components (1) out of the above components for the primer were kneaded with a batch type kneader. Then, the components (2) were added thereto, and the mixture was stirred and dispersed for a residence time of 60 minutes in a sand mill. Then the components (3) were added to the resulting dispersion, and the mixture was stirred and filtered to obtain a primer (for a primer layer).

The above primer was applied onto a non-magnetic substrate consisting of a polyethylene naphthalate film with a thickness of 8 μm, and was dried and calendered to form a primer layer with a thickness of 0.9 μm. The above-described magnetic paint was applied to the primer layer with an extrusion type coater by the wet-on-wet method, and was then dried and calendered to form a magnetic layer with a thickness of 0.08 μm. The resulting sheet was oriented in a magnetic field (N—N opposed magnets (398 kA/m)+a solenoid coil (398 kA/m)), and was then dried by means of a drier and infrared radiation, to obtain a magnetic sheet.

<Components of Paint for Back Coat Layer>

| | |
|---|---|
| Carbon black (average particle size: 25 nm) | 80 parts |
| Carbon black (average particle size: 350 nm) | 10 parts |
| Granular iron oxide particles (average particle size: 50 nm) | 10 parts |
| Nitrocellulose | 45 parts |
| Polyurethane resin | 30 parts |
| Cyclohexanone | 260 parts |
| Toluene | 260 parts |
| Methyl ethyl ketone | 525 parts |

The above components of a paint for a back coat layer were dispersed in a sand mill, and polyisocyanate (15 parts) was added thereto to prepare the paint for a back coat layer. The paint was filtered and was then applied to the other surface of the above-obtained magnetic sheet on the opposite side of the magnetic layer, and was dried.

The magnetic sheet having the back coat layer formed thereon, thus obtained, was mirror-finished with a seven-stage calender comprising metal rolls, at 100° C. under a linear pressure of 196 kN/m (calendering). The resulting magnetic sheet was wound onto a core, and was aged in this state at 60° C. for 48 hours, to obtain a magnetic sheet for evaluating tests.

Example 2

A magnetic sheet for evaluating tests was prepared in the same manners as in Example 1, except that the amount of tetrahydrofuran out of the components for the surface-treating step (1) among the components of the magnetic paint was changed to 174 parts (the solid content concentration of the first composition: 40% by weight).

Example 3

A magnetic sheet for evaluating tests was prepared in the same manners as in Example 1, except that the amount of tetrahydrofuran out of the components for the surface-treating step (1) among the components of the magnetic paint was changed to 464 parts (the solid content concentration of the first composition: 20% by weight); that the conditions for stirring the mixture in the tank in the surface-treating step were changed as follows: the rotary blade diameter: 50 mm; the gap: 2 mm; the revolution rate: 8,000 rpm; and the shear rate: $1.1 \times 10^5$/sec. (stirring conditions B); and that the solid content concentration of the second composition was changed to 95% by weight.

Example 4

A magnetic sheet for evaluating tests was prepared in the same manners as in Example 1, except that the amount of tetrahydrofuran out of the components for the surface-treating step (1) among the components of the magnetic paint was changed to 464 parts (the solid content concentration of the first composition: 20% by weight); and that the solid content concentration of the second composition was changed to 95% by weight.

Example 5

A magnetic sheet for evaluating tests was prepared in the same manners as in Example 1, except that the amount of tetrahydrofuran out of the components for the surface-treating step (1) among the components of the magnetic paint was changed to 464 parts (the solid content concentration of the first composition: 20% by weight); and that the solid content concentration of the second composition was changed to 90% by weight.

Example 6

A magnetic sheet for evaluating tests was prepared in the same manners as in Example 1, except that the amount of tetrahydrofuran out of the components for the surface-treating step (1) among the components of the magnetic paint was changed to 464 parts (the solid content concentration of the first composition: 20% by weight); and that the solid content concentration of the second composition was changed to 80% by weight.

Example 7

A magnetic sheet for evaluating tests was prepared in the same manners as in Example 2, except that the conditions for stirring the mixture in the tank during the surface-treating step were changed as follows: rotary blade diameter: 50 mm; gap: 5 mm; revolution rate: 1,500 rpm; and shear rate: 7.9×10³/sec. (stirring conditions C).

Example 8

A magnetic sheet for evaluating tests was prepared in the same manners as in Example 4, except that the magnetic powder (1) comprising granular iron nitride particles out of the components for the surface-treating step (1) among the components of the magnetic paint was changed to magnetic powder comprising acicular particles (Fe—Co—Al—Y [σs: 80 Am²/kg (80 emu/g); Hc: 1,800 Oe; and major axis: 25 nm]).

Example 9

A magnetic sheet for evaluating tests was prepared in the same manners as in Example 7, except that the magnetic powder (1) comprising granular iron nitride particles out of the components for the surface-treating step (1) among the components of the magnetic paint was changed to magnetic powder comprising acicular particles (Fe—Co—Al—Y [σs: 80 Am²/kg (80 emu/g); Hc: 1,800 Oe; and major axis: 25 nm]).

Example 10

A magnetic sheet for evaluating tests was prepared in the same manners as in Example 4, except that the magnetic powder (1) comprising granular iron nitride particles out of the components for the surface-treating step (1) among the components of the magnetic paint was changed to hexagonal plate-form ferrite particles (Hc: 2,000 Oe; average plate size: 20 nm; and as: 50 emu/g).

Example 11

A magnetic sheet for evaluating tests was prepared in the same manners as in Example 7, except that the magnetic powder (1) comprising granular iron nitride particles out of the components for the surface-treating step (1) among the components of the magnetic paint was changed to hexagonal plate-form ferrite particles (Hc: 2,000 Oe; average plate size: 20 nm; and as: 50 emu/g).

Comparative Example 1

A magnetic sheet for evaluating tests was prepared in the same manners as in Example 6, except that the amount of tetrahydrofuran out of the components for the surface-treating step (1) among the components of the magnetic paint was changed to 142 parts (the solid content concentration of the first composition: 45% by weight).

Comparative Example 2

A magnetic sheet for evaluating tests was prepared in the same manners as in Example 2, except that the solid content concentration of the second composition was changed to 70% by weight.

Comparative Example 3

A magnetic sheet for evaluating tests was prepared in the same manners as in Example 1, except for the following: the components for the surface-treating step (1) among the components (1) of the magnetic paint, in which the amount of tetrahydrofuran was changed to 12. 9 parts, were added to the components for the kneading step (3), and the resulting mixture was kneaded in the kneading step, without conducting the surface-treating step and the concentrating step.

Comparative Example 4

A magnetic sheet for evaluating tests was prepared in the same manners as in Comparative Example 3, except that the magnetic powder (1) comprising granular iron nitride particles out of the components for the surface-treating step (1) among the components of the magnetic paint was changed to magnetic powder comprising acicular particles (Fe—Co—Al—Y [σs: 80 Am²/kg (80 emu/g); Hc: 1,800 Oe; and major axis: 25 nm]).

Comparative Example 5

A magnetic sheet for evaluating tests was prepared in the same manners as in Comparative Example 3, except that the magnetic powder (1) comprising granular iron nitride particles out of the components for the surface-treating step (1) among the components of the magnetic paint was changed to hexagonal plate-form ferrite particles (Hc: 2,000 Oe; average plate size: 20 nm; and as: 50 emu/g).

The resultant magnetic sheets for evaluating tests were evaluated according to the following methods.

<Magnetic Characteristics>

The magnetic characteristics of the magnetic sheets were measured with a sample vibration type flux meter (VSM manufactured by Toei Kogyo Co., Ltd.) in a maximal magnetic field of 800 kA/m (10 kOe). A hysteresis loop was recorded, from which the characteristic values of SR (gradation) and SFD (a magnetic field inversion distribution) were determined according to the conventional methods.

<Surface Roughness of Magnetic Layer>

A sample of 12.5 mm×100 mm was cut out of the magnetic sheet. The roughness of the uppermost layer of the sample, coated with the magnetic paint, was determined as an arithmetical mean roughness Ra, using a non-contact three-dimensional profilometer (NewView 5000 manufactured by ZYGO).

TABLE 1

| | Ex. 1 | Ex. 2 | Ex. 3 | Ex. 4 | Ex. 5 | Ex. 6 |
|---|---|---|---|---|---|---|
| Magnetic powder | Granular iron nitride | Granular iron nitride | Granular iron nitride | Granular iron nitride | Granular iron nitride | Granular iron nitride |
| Solid content concentration of first composition (% by weight) | 30 | 40 | 20 | 20 | 20 | 20 |
| Stirring conditions | A | A | B | A | A | A |
| Solid content concentration of second composition (% by weight) | 90 | 90 | 95 | 95 | 90 | 80 |

TABLE 1-continued

| | | | | | | | |
|---|---|---|---|---|---|---|---|
| Magnetic characteristics | SR | 0.84 | 0.82 | 0.87 | 0.86 | 0.86 | 0.83 |
| | SFD | 0.55 | 0.57 | 0.52 | 0.53 | 0.54 | 0.56 |
| Surface roughness Ra (nm) | | 2.2 | 2.4 | 1.8 | 1.9 | 2.1 | 2.3 |

| | | Ex. 7 | Ex. 8 | Ex. 9 | Ex. 10 | Ex. 11 |
|---|---|---|---|---|---|---|
| Magnetic powder | | Granular iron nitride | Acicular magnetic particle (25 nmMP) | Acicular magnetic particle (25 nmMP) | Hexagonal plate-form ferrite (20 nm) | Hexagonal plate-form ferrite (20 nm) |
| Solid content concentration of first composition (% by weight) | | 40 | 20 | 40 | 20 | 40 |
| Stirring conditions | | C | A | C | A | C |
| Solid content concentration of second composition (% by weight) | | 90 | 95 | 90 | 95 | 90 |
| Magnetic characteristics | SR | 0.81 | 0.86 | 0.82 | 0.65 | 0.6 |
| | SFD | 0.59 | 0.80 | 0.85 | 0.58 | 0.63 |
| Surface roughness Ra (nm) | | 2.6 | 1.7 | 2.1 | 1.8 | 2.4 |

| | | C. Ex. 1 | C. Ex. 2 | C. Ex. 3 | C. Ex. 4 | C. Ex. 5 |
|---|---|---|---|---|---|---|
| Magnetic powder | | Granular iron nitride | Granular iron nitride | Granular iron nitride | Acicular magnetic particle (25 nmMP) | Hexagonal plate-form ferrite (20 nm) |
| Solid content concentration of first composition (% by weight) | | 45 | 40 | — | — | — |
| Stirring conditions | | A | A | — | — | — |
| Solid content concentration of second composition (% by weight) | | 80 | 70 | — | — | — |
| Magnetic characteristics | SR | 0.79 | 0.75 | 0.74 | 0.79 | 0.57 |
| | SFD | 0.63 | 0.64 | 0.67 | 0.90 | 0.66 |
| Surface roughness Ra (nm) | | 3.2 | 3.6 | 3.7 | 3.1 | 3.3 |

All the magnetic sheets of Examples 1 to 11 of the present invention were better in magnetic characteristics and were smaller in the surface roughness of its magnetic layer, than any of the magnetic sheets of Comparative Examples 1 to 5. Thus, it was confirmed that the magnetic sheets of the present invention can provide magnetic recording media excellent in recording characteristics relative in a short wavelength range.

The invention claimed is:

1. A method for preparing a magnetic paint, comprising
   a surface-treating step for a magnetic powder, to obtain a first composition by mixing and stirring a composition which comprises magnetic powder having a particle size of smaller than 50 nm, a dispersant, a non-magnetic powder, a binder resin, and an organic solvent, and which contains 40% by weight or less of a non-solvent component, while applying a shear force to the composition;
   a concentrating step to obtain a second composition by concentrating the first composition until the content of the non-solvent components of the first composition reaches at least 80% by weight;
   a kneading step for kneading the second composition from the previous step, wherein the second composition which is kneaded is supplemented with a further binder resin and a further organic solvent;
   a diluting step for diluting the composition from the previous step; and
   a dispersing step for dispersing the composition from the previous step.

2. The method of claim 1, wherein the shear force is applied so that a shear rate is at least $10^4$/sec.

3. The method of claim 1, wherein the dispersant is contained in an amount of from 0.1 to 10% by weight based on the weight of the magnetic powder.

4. The method of claim 1, wherein the binder resin is contained in an amount of from 0.5 to 20% by weight based on the weight of the magnetic powder.

5. The method of claim 1, wherein the content of the non-solvent components of the composition subjected to the surface-treating step is 1% by weight or more.

* * * * *